(12) United States Patent
Horng et al.

(10) Patent No.: US 6,512,319 B1
(45) Date of Patent: Jan. 28, 2003

(54) POLE PLATE STRUCTURE FOR A MOTOR STATOR

(75) Inventors: Alex Horng, Kaohsiung (TW); Ching-Shen Hong, Kaohsiung (TW)

(73) Assignee: Sunonwealth Electric Machine Industry Co., Ltd., Kaohsiung (TW)

( * ) Notice: Subject to any disclaimer, the term of this patent is extended or adjusted under 35 U.S.C. 154(b) by 0 days.

(21) Appl. No.: 09/912,515

(22) Filed: Jul. 26, 2001

(51) Int. Cl.⁷ .................................................. H02K 1/00
(52) U.S. Cl. ......................................... 310/254; 310/216
(58) Field of Search ............................... 310/216, 217, 310/254, 257, 42; 29/596–598; 417/423.12–423.15, 423.7, 420

(56) References Cited

U.S. PATENT DOCUMENTS

| | | | | |
|---|---|---|---|---|
| 3,450,913 A | * | 6/1969 | Baker et al. ................ | 310/263 |
| 4,201,930 A | * | 5/1980 | Inagaki et al. .............. | 310/263 |
| 5,831,359 A | * | 11/1998 | Jeske ........................ | 310/49 R |
| 5,962,947 A | * | 10/1999 | Suzuki et al. ............... | 310/257 |
| 6,031,304 A | * | 2/2000 | Suzuki et al. ............. | 310/49 R |
| 6,270,325 B1 | * | 8/2001 | Hsieh .................... | 417/423.12 |
| 6,281,616 B1 | * | 8/2001 | Burgbacher et al. ........ | 310/257 |

* cited by examiner

*Primary Examiner*—Tran Nguyen
(74) *Attorney, Agent, or Firm*—Bacon & Thomas

(57) ABSTRACT

A pole plate for a motor stator includes a central hole and a plurality of circumferentially regularly spaced sector edge. Each sector edge has a pole face extending in a plane perpendicular to a planar surface of the pole plate. The pole face includes a distal side that is opposite to the respective sector edge. A central line passing though a middle point of the respective sector edge and a middle point of the distal side of the respective pole face are not coincident with and at an angle with a radial line passing through a center of the central hole and the middle point of the respective sector edge.

3 Claims, 4 Drawing Sheets

POLE PLATE STRUCTURE FOR A MOTOR STATOR

BACKGROUND OF THE INVENTION

1. Field of the Invention

The present invention relates to a pole plate structure for a motor stator. More particularly, the present invention relates to a pole plate structure for a brushless d.c. motor stator that increases the rotating torque of the motor while allowing easy starting of the motor and reducing the cogging torque.

2. Description of the Related Art

A conventional cooling fan motor, as illustrated in FIGS. 1 and 2 of the drawings, discloses a stator for a brushless d.c. motor comprising an upper pole plate 91 and a lower pole plate 92 respectively mounted to upper and lower ends of a set of windings 93. Each pole plate 91, 92 comprises a plurality of vertically extending magnetic pole faces 94 for increasing a rotating torque of the rotor. In order to allow easy starting and avoid dead corners in rotation of the rotor, each magnetic pole face 94 includes a chamfered corner 95. However, since the permanent magnet of the rotor is comprised of alternatively disposed north poles and south poles and since the rotor is driven by the alternating magnetic fields generated by the stator winding, changes in the rotating torque or uneven rotating torque (the so-called "cogging torque") occur during a transient change between the north pole and south pole of the permanent magnet of the rotor relative to the magnetic pole faces of the upper and lower pole plates 91 and 92. As illustrated in FIGS. 1 and 2, at least an edge 96 of the magnetic pole face 94 represents a rectilinear line that is perpendicular to a planar surface of the pole plates 91, 92, which generates a significant cogging torque during rotation of the rotor. Trembling of the rotor as a result of cogging torque is more obvious when the rotor rotates at low speed.

SUMMARY OF THE INVENTION

An object of the present invention is to provide a pole plate structure for a motor stator having a larger relative induction area between the rotor and the stator magnetic poles to thereby increase the rotating torque of the rotor. In addition, the pole plate structure allows easy starting of the rotor and reduces the cogging torque during rotation of the rotor.

A pole plate for a motor stator in accordance with the present invention comprises a central hole and a plurality of circumferentially regularly spaced sector edges. Each sector edge has a pole face extending in a plane perpendicular to a planar surface of the pole plate. The pole face includes a distal side that is opposite to the respective sector edge. A central line passing through a middle point of the respective sector edge and a middle point of the distal side of the respective pole face are not coincident with and at an angle with a radial line passing through a center of the central hole and the middle point of the respective sector edge.

Other objects, specific advantages, and novel features of the invention will become more apparent from the following detailed description and preferable embodiments when taken in conjunction with the accompanying drawings.

DETAILED DESCRIPTION OF THE PREFERRED EMBODIMENTS

A preferred embodiment in accordance with the present invention will now be described with reference to the accompanying drawings.

Figure 1:
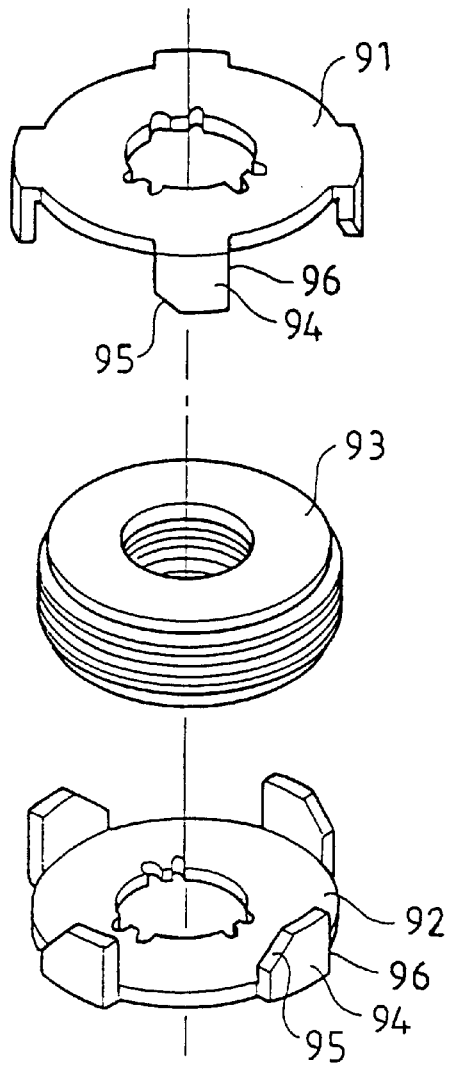
FIG. 1 is an exploded perspective view of a conventional stator of a cooling fan.
Figure 2:
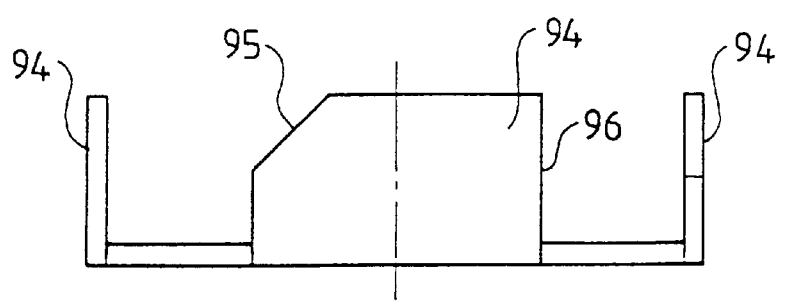
FIG. 2 is a side view of the conventional stator in FIG. 1.
Figure 3:
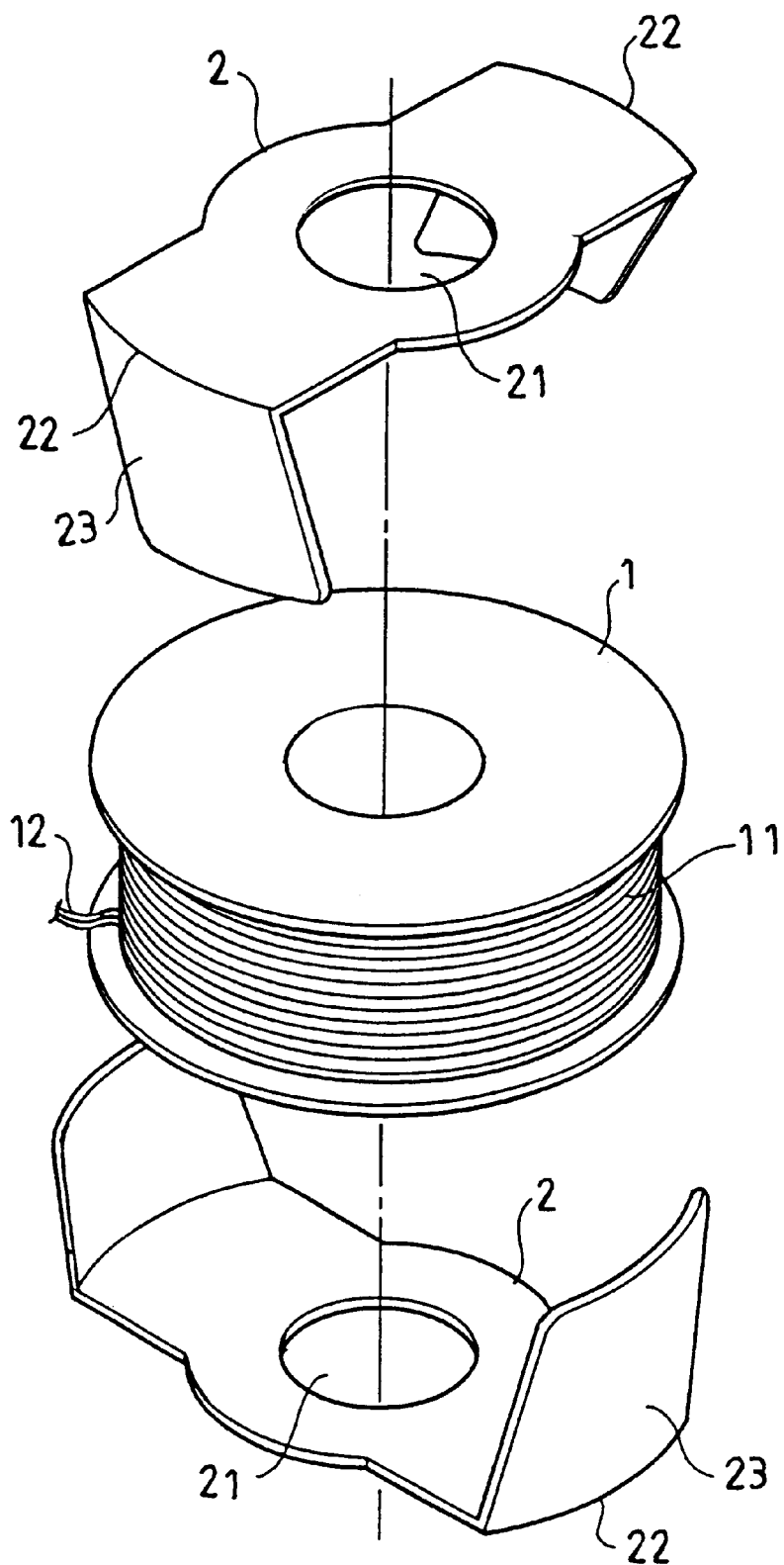
FIG. 3 is an exploded perspective view of a stator in accordance with the present invention.

Referring to FIG. 3, a stator for a brushless d.c. motor in accordance with the present invention generally includes a bobbin 1 and at least two pole plates 2. A winding 11 is wound around the bobbin 1 and includes terminals 12 for electrical connection to a power source.

Figure 4:
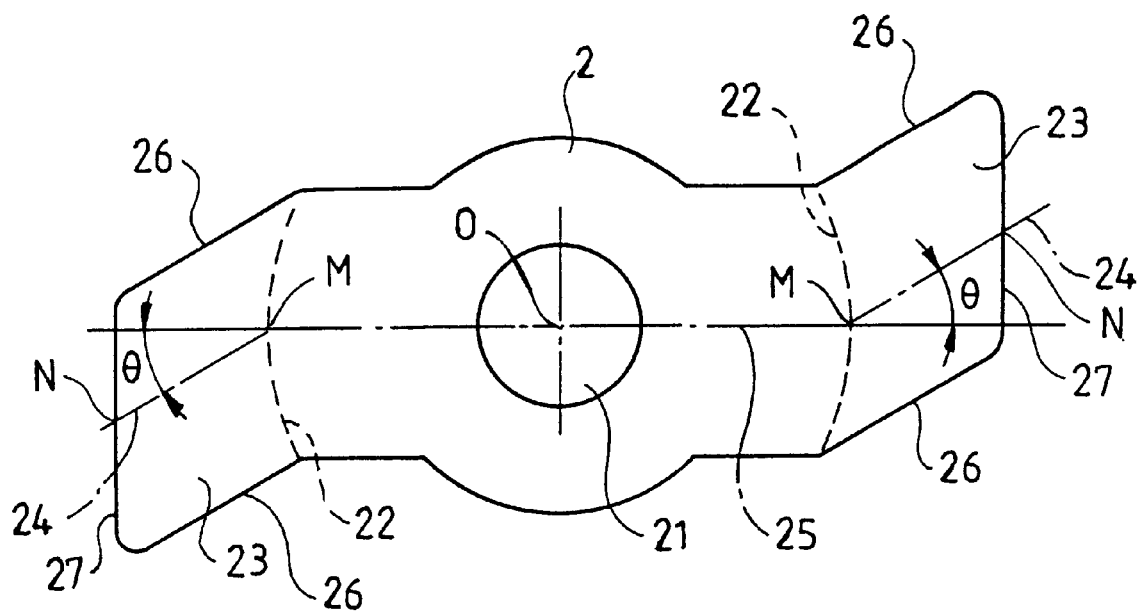
FIG. 4 is a flattened plan view of a pole plate of the stator in accordance with the present invention.

Referring to FIGS. 3 and 4, the pole plates 2 are made of magnetically conductive material and, in this embodiment, pole plates 2 are respectively mounted to two ends of the bobbin 1. Each pole plate 2 comprises at least two circumferentially regularly spaced sector edges 22. In this embodiment, each pole face 2 comprises two diametrically disposed sector edges 22 each having a pole face 23 extending in a plane perpendicular to a planar surface of the respective pole plate 2. Each pole face 23 comprises a distal side 27 that is opposite to the respective sector edge 22 and two parallel sides 26. A central line MN passing through a middle point M of the respective sector edge 22 and a middle point N of the distal side 27 of the respective pole face 23 is at an angle θ with a radial line OM passing through the middle points M of the respective sector edge 22 and the center O of the respective sector edge M of the respective pole plate 2. The angle θ is not equal to zero; namely, the central line MN is not coincident with the radial line OM. Each of the parallel sides 26 is not parallel to the radial line OM.

As illustrated in FIG. 4 that depicts a flattened view of a pole plate 2, the pole faces 23 extend from the two diametrically disposed sector edges 22 that have a common center O of the central hole 21. The central line MN of the respective pole face 23 is not coincident with the radial line OM. In addition, the two pole faces 23 are symmetric to a longitudinal axis 25 passing through the middle points M of the sector edges 22 and the center O of the central hole 21 of the respective pole plate 2.

Figure 5:
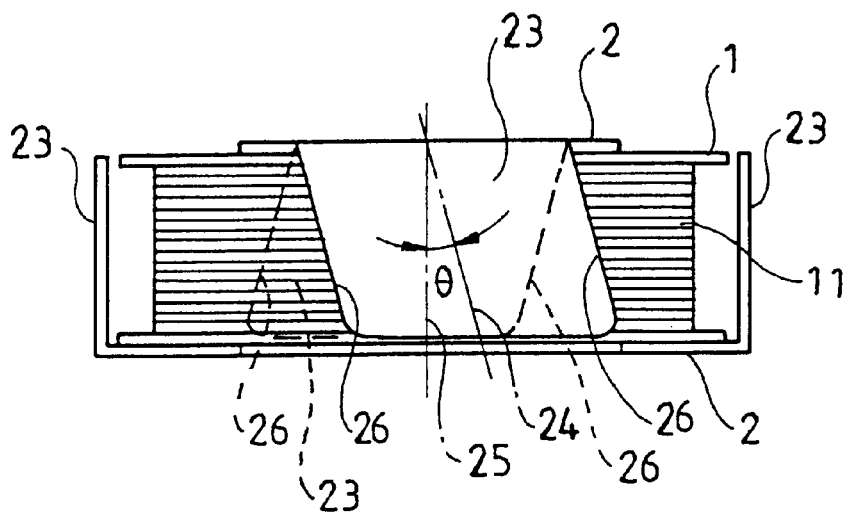
FIG. 5 is a sectional view of the stator in accordance with the present invention.

Referring to FIG. 5 that shows the stator in accordance with the present invention in an assembled state, at leas two pole plates 2 are respectively mounted to two ends of the bobbin 1. The pole faces 23 are symmetric to the longitudinal axis 25 of the respective pole plate 2. Thus, the respective pole plate 2 has a relatively large induction area. In addition, each of the two inclined sides 26 of the respective pole face 23 is at an angle θ with the longitudinal axis 25 (i.e., not coincident). Therefore, no dead corner exist when the permanent magnet (not shown) of the rotor (not shown) comprising alternately disposed north poles and south poles and the pole faces 23 with inclined sides 26 induct each other. The cogging torque during rotation of the rotor is less significant. Trembling during rotation of the rotor is reduced.

Figure 6:
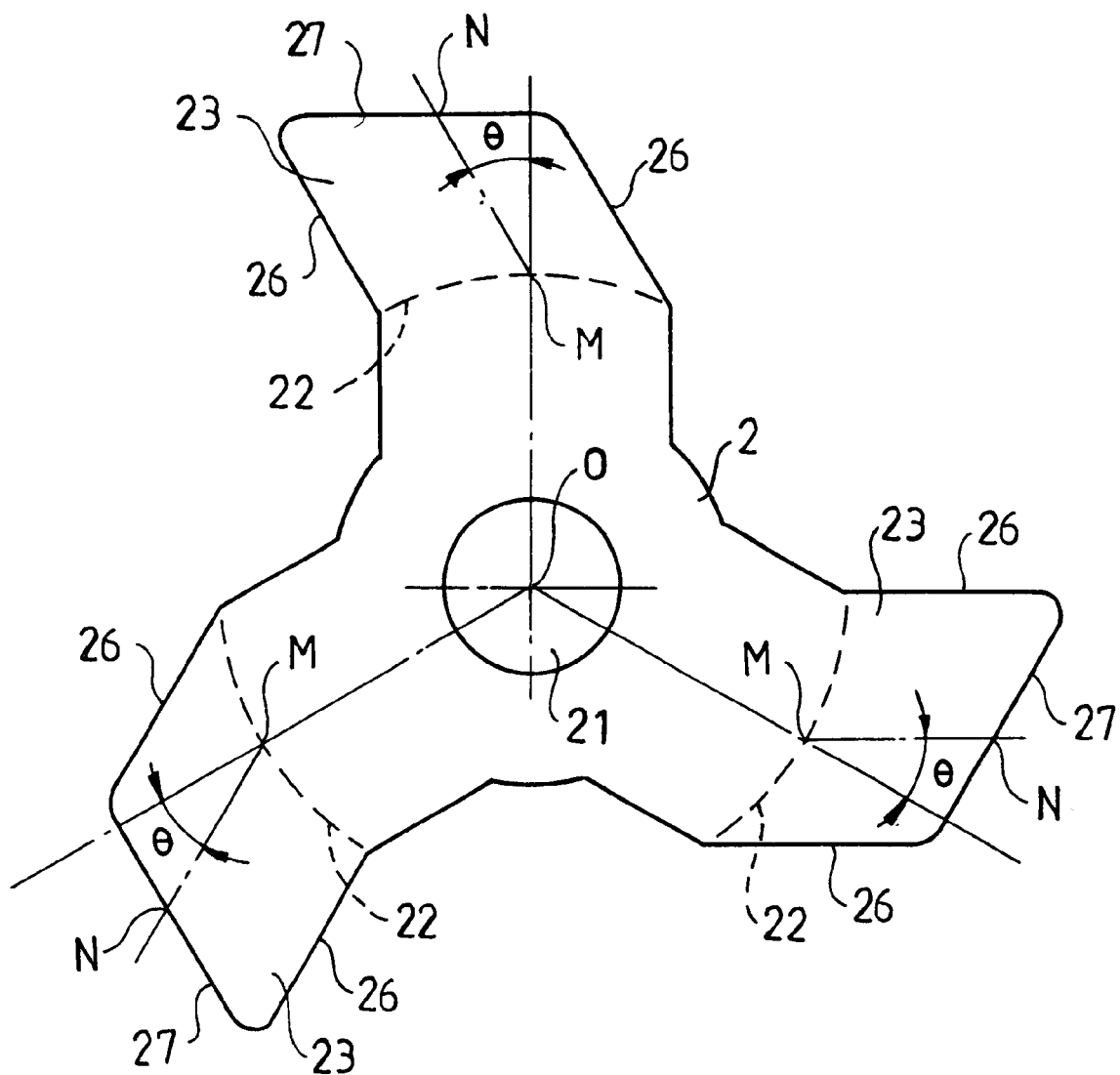
FIG. 6 is a flattened plan view of a modified embodiment of the pole plate of the stator in accordance with the present invention.

FIG. 6 depicts a flattened view of a modified embodiment of the pole plate 2 of the stator in accordance with the present invention. In this embodiment, the pole plate 2 comprises three circumferentially regularly spaced sector edges 22 each having a pole face 23 extending in a plane that is perpendicular to a planar surface of the respective pole plate 2. It is appreciated that the pole plate 2 may include more than three sector edges 22 each having a pole face 23. Similar to the above embodiment, each pole face 23 comprises a distal side 27 opposite to the respective sector edge 22. A central line MN passing through a middle point M of the respective sector edge 22 and a middle point N of the distal side 27 of the respective pole face 23 is at an angle θ with (i.e., not coincident with) a radial line OM passing through the middle points M of the sector edges 22 and the center O of the central hole 21 of the respective pole plate 2. Each pole face 23 further comprises two opposite sides 26 that are inclined and parallel to each other. Each side 26 is not parallel to the radial line OM of the respective pole face 23.

In the pole plate structure of a motor stator in accordance with the present invention, the central line MN of each pole face 23 is not incident with the radial line OM of the respective pole plate 2. Thus, the permanent magnet of the rotor and the pole faces 23 always have asymmetric induction therebetween to thereby allow easy starting of the rotor. In addition, no dead corner exists when the permanent magnet comprising alternately disposed north poles and south poles and the pole faces 21 with curved sides 23 induct each other. The cogging torque during rotation of the rotor is less significant, and the trembling problem of the rotor as a result of the cogging torque is reduced.

Although the invention has been explained in relation to its preferred embodiment as mentioned above, it is to be understood that many other possible modifications and variations can be made without departing from the scope of the invention. It is, therefore, contemplated that the appended claims will cover such modifications and variations that fall within the true scope of the invention.

What is claimed is:

1. A pole plate for a motor stator, comprising a central hole and a plurality of circumferentially regularly spaced sector edges, each said sector edge having a pole face extending in a plane perpendicular to a planar surface of the pole plate, the pole face including a distal side that is opposite to the respective sector edge, a central line passing through a middle point of the respective sector edge and a middle point of the distal side of the respective pole face being not coincident with and at an angle with a radial line passing through a center of the central hole and the middle point of the respective sector edge, wherein each said pole face has two sides that are not parallel to the radial line passing through the center of the central hole and the middle point of the respective sector edge.

2. The pole plate for a motor stator as claimed in claim 1, wherein the two sides of the respective pole face are inclined and parallel to each other.

3. The pole plate for a motor stator as claimed in claim 1, wherein each said pole plate comprises two diametrically disposed said sector edges with the pole faces being formed symmetric to a longitudinal line passing through the middle points of the pole faces and a center of the central hole of the pole plate.

* * * * *